US010621954B2

(12) United States Patent
Stein et al.

(10) Patent No.: US 10,621,954 B2
(45) Date of Patent: Apr. 14, 2020

(54) COMPUTERIZED SYSTEM AND METHOD FOR AUTOMATICALLY CREATING AND APPLYING A FILTER TO ALTER THE DISPLAY OF RENDERED MEDIA

(71) Applicant: OATH INC., New York, NY (US)

(72) Inventors: Robert Stein, New York, NY (US); Tony Ke, New York, NY (US); Vinay Pulim, Brooklyn, NY (US)

(73) Assignee: OATH INC., New York, NY (US)

( * ) Notice: Subject to any disclaimer, the term of this patent is extended or adjusted under 35 U.S.C. 154(b) by 9 days.

(21) Appl. No.: 15/890,394

(22) Filed: Feb. 7, 2018

(65) Prior Publication Data
US 2018/0166043 A1 Jun. 14, 2018

Related U.S. Application Data

(63) Continuation of application No. 14/886,645, filed on Oct. 19, 2015, now Pat. No. 9,905,200.

(51) Int. Cl.
G06F 3/14 (2006.01)
G09G 5/02 (2006.01)
(Continued)

(52) U.S. Cl.
CPC ............ G09G 5/30 (2013.01); G06F 3/1423 (2013.01); G06T 5/20 (2013.01); G09G 5/026 (2013.01); G09G 5/14 (2013.01); G09G 5/377 (2013.01); G09G 5/391 (2013.01); G09G 5/393 (2013.01); H04N 19/117 (2014.11);
(Continued)

(58) Field of Classification Search
CPC ......... G06F 3/1423; G06T 2207/10024; G06T 5/20; G09G 2320/0276; G09G 2320/0666; G09G 2340/02; G09G 2340/0435; G09G 5/026; G09G 5/14; G09G 5/30; G09G 5/377; G09G 5/391; G09G 5/393; H04N 19/117; H04N 19/136; H04N 19/156; H04N 19/162; H04N 19/86
See application file for complete search history.

(56) References Cited

U.S. PATENT DOCUMENTS 7,127,106 B1 10/2006 Neil et al.
2001/0016051 A1 8/2001 Rhoads
(Continued)

Primary Examiner — Sing-Wai Wu
(74) Attorney, Agent, or Firm — James J. DeCarlo; Greenberg Traurig, LLP

(57) ABSTRACT

Disclosed are systems and methods for improving interactions with and between computers in content searching, generating, hosting and/or providing systems supported by or configured with personal computing devices, servers and/or platforms. The systems interact to identify and retrieve data within or across platforms, which can be used to improve the quality of data used in processing interactions between or among processors in such systems. The disclosed systems and methods provide systems and methods for automatically filtering a compressed media file for perceptual display of the media content in a modified, higher-resolution format. The disclosed systems and methods apply novel visual filtering techniques to a compressed media file that enable the display of the rendered media content to appear to be displayed as a modified, higher-resolution version of itself without actually modifying the compressed media file during rendering.

20 Claims, 7 Drawing Sheets

(51) Int. Cl.

| | | |
|---|---|---|
| *G09G 5/14* | (2006.01) | |
| *G09G 5/30* | (2006.01) | |
| *G09G 5/377* | (2006.01) | |
| *G09G 5/391* | (2006.01) | |
| *G09G 5/393* | (2006.01) | |
| *H04N 19/156* | (2014.01) | |
| *G06T 5/20* | (2006.01) | |
| *H04N 19/136* | (2014.01) | |
| *H04N 19/162* | (2014.01) | |
| *H04N 19/117* | (2014.01) | |
| *H04N 19/86* | (2014.01) | |

(52) U.S. Cl.
CPC ......... *H04N 19/136* (2014.11); *H04N 19/156* (2014.11); *H04N 19/162* (2014.11); *H04N 19/86* (2014.11); *G06T 2207/10024* (2013.01); *G09G 2320/0276* (2013.01); *G09G 2320/0606* (2013.01); *G09G 2320/0666* (2013.01); *G09G 2340/02* (2013.01); *G09G 2340/0435* (2013.01); *G09G 2360/122* (2013.01); *G09G 2370/02* (2013.01); *G09G 2370/022* (2013.01); *G09G 2370/10* (2013.01); *G09G 2370/16* (2013.01)

(56) References Cited

U.S. PATENT DOCUMENTS

| | | | |
|---|---|---|---|
| 2003/0001013 A1* | 1/2003 | Akamine | G06F 16/955 235/454 |
| 2003/0043414 A1 | 3/2003 | Brady | |
| 2004/0156613 A1* | 8/2004 | Hempel | H04N 5/913 386/328 |
| 2005/0169366 A1* | 8/2005 | Clark | H04N 19/50 375/240.01 |
| 2005/0179568 A1* | 8/2005 | Wee | H04N 21/234 341/50 |
| 2005/0243368 A1 | 11/2005 | Sedky et al. | |
| 2007/0196028 A1 | 8/2007 | Kokemohr et al. | |
| 2008/0056615 A1 | 3/2008 | Kuno | |
| 2011/0182529 A1 | 7/2011 | Kempe et al. | |
| 2011/0188749 A1 | 8/2011 | Zhu et al. | |
| 2011/0273459 A1 | 11/2011 | Letellier et al. | |
| 2014/0198844 A1 | 7/2014 | Hsu et al. | |

* cited by examiner

COMPUTERIZED SYSTEM AND METHOD FOR AUTOMATICALLY CREATING AND APPLYING A FILTER TO ALTER THE DISPLAY OF RENDERED MEDIA

CROSS REFERENCE TO RELATED APPLICATION

This application is a continuation of, and claims priority from U.S. patent application Ser. No. 14/886,645, filed on Oct. 19, 2015, which is incorporated herein by reference in its entirety.

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates generally to improving the performance of content rendering, searching, generating, providing and/or hosting computer systems and/or platforms by modifying the capabilities and providing non-native functionality to such systems and/or platforms for automatically creating and applying a filter for perceptually altering the display of rendered media.

SUMMARY

The present disclosure provides systems and methods for improved the presentation of compressed media. According to embodiments of the instant disclosure, systems and methods are disclosed for automatically creating and applying a filter for perceptually altering the display of rendered media without actually modifying rendered media. In some embodiments, the disclosed systems and methods apply novel visual filtering techniques to a compressed media file in order to render such media to appear as a higher resolution than that of the compressed media file. Conventionally, the rendering of compressed media files result in "low quality" or low-resolution display of the media content; however, through implementations of the disclosed systems and methods, the display of a compressed media file would result in modified resolution giving a higher resolution appearance upon display due to the application of the disclosed filtering technology.

The applications of the disclosed systems and methods provide improvements to a number of technological areas, for example, those related to systems and processes that handle or process content rendering, distribution and/or recommendations, such as, but not limited to, search engines, local and/or web-based applications, e-mail or other types of media rendering or recommendation platforms, electronic social networking platforms and the like. The disclosed systems and methods can effectuate increased speed and efficiency in the ways users can access and view media.

For example, typically users are unable to view high-resolution (e.g., High-Definition video) content when they are subject to weak WiFi® connections or low-bandwidth, or even when such users are viewing content on their mobile devices. However, through implementations of the disclosed systems and methods, such users are afforded the previously non-existent ability to experience high-resolution like content despite being provided compressed, low-resolution media (which is typically the only media accessible within such low-network connectivity environments). The disclosed technology provides users with increased opportunities for receiving, viewing and/or transmitting "high-quality" content. That is, users (e.g., people, third parties, entities, and the like) can view, share or otherwise communicate content over a network as a compressed or low-quality file, and such file is renderable to appear as if it was not compressed or low-quality. This enables, among other benefits, the communication and rendering of content over any type of network and on any type of device, regardless of network connectivity factors and device capabilities. Additionally, this also provides mechanisms for user's to view low-quality content as modified, high-quality content without the need for actually modifying the original content file.

In accordance with one or more embodiments, a method is disclosed which includes communicating, via a computing device, a request for content; receiving, via the computing device, a media file in response to the request, the media file comprising gradient and resolution parameters; determining, via the computing device, a bitmap filter to apply to the received media file, the bitmap filter comprising a gradient layer and a tile layer, the gradient layer comprising information associated with color attributes, the tile layer comprising information associated with resolution attributes; visibly displaying, on a display of the computing device, the media file with the bitmap filter overlaid on top of the media file; and rendering, via the computing device, the displayed media file such that the gradient and resolution parameters of the media file visually appear to be modified based on the gradient layer and the tile layer of the overlaid bitmap filter.

In accordance with one or more embodiments, a non-transitory computer-readable storage medium is provided, the non-transitory computer-readable storage medium tangibly storing thereon, or having tangibly encoded thereon, computer readable instructions that when executed cause at least one processor to perform a method for automatically creating and applying a filter for perceptually altering the display of rendered media without actually modifying rendered media.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DESCRIPTION OF EMBODIMENTS

Figure 1:
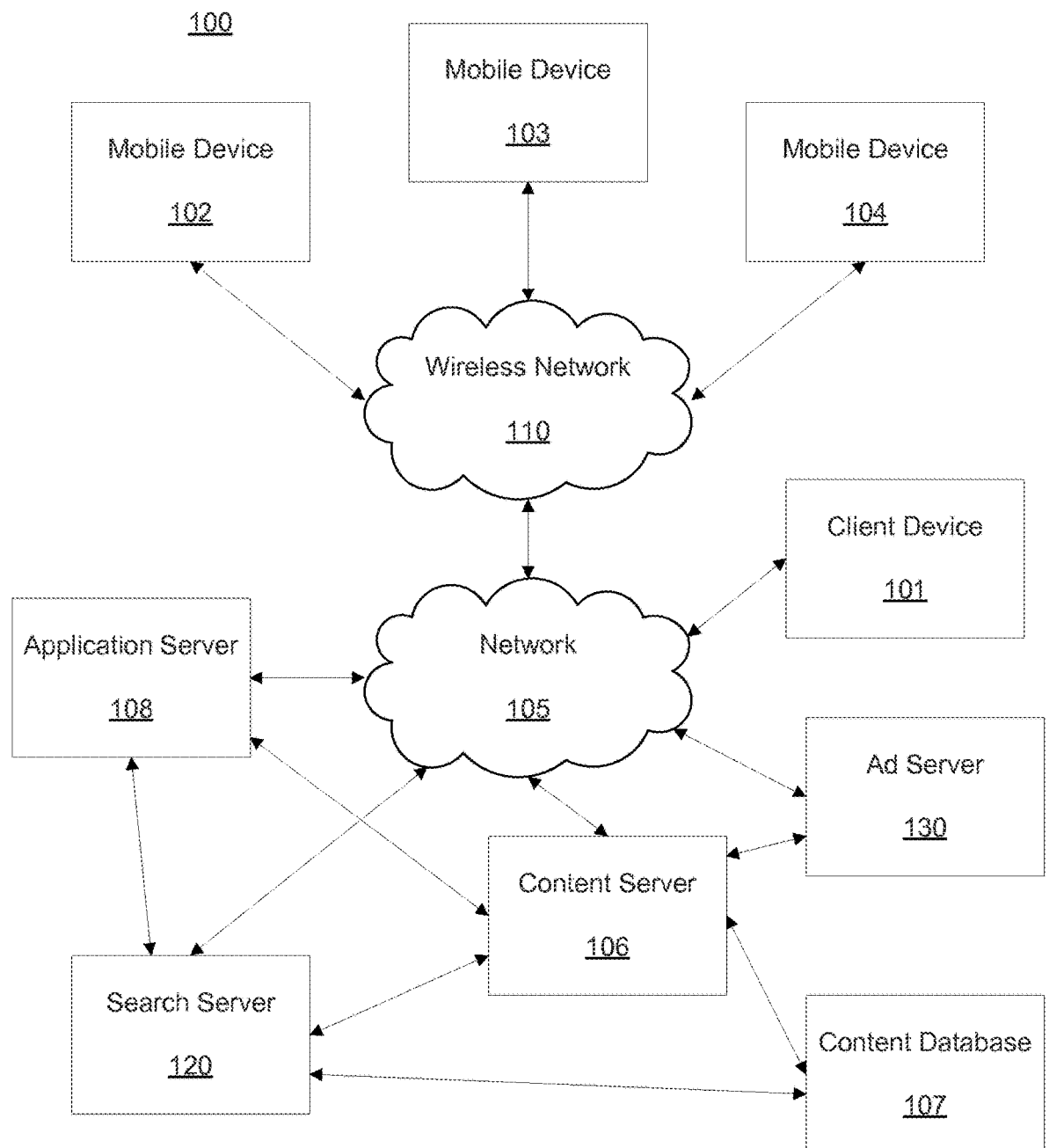
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a wired or wireless line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

A wireless network may further employ a plurality of network access technologies, including Wi-Fi, Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations. For example, a simple smart phone, phablet or tablet may include a numeric keypad or a display of limited functionality, such as a monochrome liquid crystal display (LCD) for displaying text. In contrast, however, as another example, a web-enabled client device may include a high resolution screen, one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like.

A client device may include or may execute a variety of possible applications, such as a client software application enabling communication with other devices, such as communicating one or more messages, such as via email, for example Yahoo!® Mail, short message service (SMS), or multimedia message service (MMS), for example Yahoo! Messenger®, including via a network, such as a social network, including, for example, Tumblr®, Facebook®, LinkedIn®, Twitter®, Flickr®, or Google+®, Instagram™, to provide only a few possible examples. A client device may also include or execute an application to communicate content, such as, for example, textual content, multimedia content, or the like. A client device may also include or execute an application to perform a variety of possible tasks, such as browsing, searching, playing various forms of content, including locally stored or streamed video, or games (such as fantasy sports leagues). The foregoing is provided to illustrate that claimed subject matter is intended to include a wide range of possible features or capabilities.

The principles described herein may be embodied in many different forms. Typically, a compressed media file is formatted in a low-resolution format in order to keep the file size down for purposes related to factors concerning storage of the file, transmission of the file, network connectivity when rendering the file, among other factors. In order to render a compressed media file, the file must be "unzipped" (or uncompressed or decoded). Even if the uncompressed media file displays high-resolution content, there is currently no system that enables rendering of the media content in the high-resolution format, or even an improved resolution that than of the compressed media file, without uncompressing or otherwise modifying the file.

The present disclosure addresses such needs by disclosing systems and methods that provide for improved presentation of media without the need for modifying the original media file. The disclosed systems and methods apply novel visual filtering techniques to a compressed media file which enables the compressed media file be displayed to appear as a higher resolution version of itself upon rendering despite the media file being formatted according to low-resolution parameters (because the file was subject to a form of compression or other type of size reduction). Thus, as discussed in more detail below, the disclosed systems and methods enable the format of a rendered compressed media file to look like it is a high-resolution (or higher than the compressed version) item of media, that is to have an improved and/or modified appearance (e.g., appear as a higher resolution format and/or have modified color attributes) despite the rendered media file remaining compressed during rendering. Therefore, as discussed in more detail below, the disclosed systems and methods provide a perceptual modification of displayed content of an original or received media file without actually changing and/or uncompressing the media file before or during rendering of the media file.

It should be understood that while the discussion herein will focus on "compressed" media files, any type of media file can be utilized within the disclosed systems and methods without departing from the scope of the instant disclosure. That is, the disclosed systems and methods are applicable to any type of file, whether a text file, video file or any other type of multi-media file, and such media file can be encoded and/or decoded, shortened (or "clipped") or even augmented or annotated with additional information. The size and file type of the media file does not change the technical steps outlined herein; however, the instant disclosure will focus on compressed media files to show that a typically low-quality rendering that results from a compressed media file playback or rendering can be improved through applications of the computerized systems and methods discussed herein.

As discussed in more detail below, the disclosed systems and methods effectuate an improved display of media content of a compressed media file through the application of a filter overlaid on top of the media file as it is being rendered, referred to as a "bitmap filter." The application of the bitmap filter involves rendering the compressed media in the background (or behind) the bitmap filter which is placed on top (or in the foreground). In other words, the bitmap filter is overlaid on top of the media content so that the media content is being played behind the applied bitmap filter such that a viewing user is seeing the media content "through the lens" of the bitmap filter. Therefore, as the media is rendered, each frame of the video is filtered (e.g., viewed or displayed) according to the parameters of the applied bitmap filter, as discussed in more detail below. As discussed below, despite the bitmap filter being applied "on top of" the media content, the bitmap filter is not viewable or visible on the display (or user interface) of the device (or application) upon which it is being applied during rendering.

As discussed in more detail below at least in relation to FIG. 6, according to some embodiments, information associated with or derived from the filtered media, inter alia, as discussed herein, can be used for monetization purposes and targeted advertising when the rendering, providing, delivering or enabling access to the filtered media. Providing targeted advertising to users associated with such discovered content can lead to an increased click-through rate (CTR) of such ads and/or an increase in the advertiser's return on investment (ROI) for serving such content provided by third parties (e.g., digital advertisement content provided by an advertiser, where the advertiser can be a third party advertiser, or an entity directly associated with or hosting the systems and methods discussed herein).

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as content server 106, application (or "App") server 108, search server 120 and advertising ("ad") server 130.

One embodiment of mobile devices 102-104 is described in more detail below. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, smart watch, tablet computers, phablets, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and an HD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102-104 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier.

In some embodiments, mobile devices 102-104 may also communicate with non-mobile client devices, such as client device 101, or the like. In one embodiment, such communications may include sending and/or receiving messages, searching for, viewing and/or sharing photographs, audio clips, video clips, or any of a variety of other forms of communications. Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 101 may also have differing capabilities for displaying navigable views of information.

Client devices 101-104 computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Network 105 is configured to couple content server 106, application server 108, or the like, with other computing devices, including, client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, QUIC (Quick UDP Internet Connection), DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

According to some embodiments, the present disclosure may also be utilized within or accessible to an electronic social networking site. A social network refers generally to an electronic network of individuals, such as acquaintances, friends, family, colleagues, or co-workers, that are coupled via a communications network or via a variety of sub-networks. Potentially, additional relationships may subsequently be formed as a result of social interaction via the communications network or sub-networks. In some embodiments, multi-modal communications may occur between members of the social network. Individuals within one or more social networks may interact or communication with other members of a social network via a variety of devices. Multi-modal communication technologies refers to a set of technologies that permit interoperable communication across multiple devices or platforms, such as cell phones, smart phones, tablet computing devices, phablets, personal computers, televisions, set-top boxes, SMS/MMS, email, instant messenger clients, forums, social networking sites, or the like.

In some embodiments, the disclosed networks 110 and/or 105 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The content server 106 may include a device that includes a configuration to provide content via a network to another device. A content server 106 may, for example, host a site or service, such as streaming media site/service (e.g., Netflix®), an email platform or social networking site, or a personal user site (such as a blog, vlog, online dating site, and the like). A content server 106 may also host a variety of other sites, including, but not limited to business sites, educational sites, dictionary sites, encyclopedia sites, wikis, financial sites, government sites, and the like. Devices that may operate as content server 106 include personal computers desktop computers, multiprocessor systems, microprocessor-based or programmable consumer electronics, network PCs, servers, and the like.

Content server 106 can further provide a variety of services that include, but are not limited to, streaming and/or downloading media services, search services, email services, photo services, web services, social networking services, news services, third-party services, audio services, video services, instant messaging (IM) services, SMS services, MMS services, FTP services, voice over IP (VOIP) services, or the like. Such services, for example a video application and/or video platform, can be provided via the application server 108, whereby a user is able to utilize such service upon the user being authenticated, verified or identified by the service. Examples of content may include images, text, audio, video, or the like, which may be processed in the form of physical signals, such as electrical signals, for example, or may be stored in memory, as physical states, for example.

An ad server 130 comprises a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user. Such sponsored advertising includes monetization techniques including sponsored search advertising, non-sponsored search advertising, guaranteed and non-guaranteed delivery advertising, ad networks/exchanges, ad targeting, ad serving and ad analytics. Such systems can incorporate near instantaneous auctions of ad placement opportunities during web page creation, (in some cases in less than 500 milliseconds) with higher quality ad placement opportunities resulting in higher revenues per ad. That is advertisers will pay higher advertising rates when they believe their ads are being placed in or along with highly relevant content that is being presented to users. Reductions in the time needed to quantify a high quality ad placement offers ad platforms competitive advantages. Thus higher speeds and more relevant context detection improve these technological fields.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers. For web portals like Yahoo!®, advertisements may be displayed on web pages or in apps resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, sex, occupation, etc.) for predicting user behavior, such as by group. Advertisements may be presented to users in a targeted audience based at least in part upon predicted user behavior (s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

Servers 106, 108, 120 and 130 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In some embodiments, users are able to access services provided by servers 106, 108, 120 and/or 130. This may include in a non-limiting example, authentication servers, search servers, email servers, social networking services servers, SMS servers, IM servers, MMS servers, exchange servers, photo-sharing services servers, and travel services servers, via the network 105 using their various devices 101-104. In some embodiments, applications, such as a streaming video application (e.g., Netflix®, Hulu®, iTunes®, Amazon Prime®, HBO Go®, and the like), blog, photo storage/sharing application or social networking application (e.g., Flickr®, Tumblr®, and the like), can be hosted by the application server 108 (or content server 106, search server 120 and the like). Thus, the application server 108 can store various types of applications and application related information including application data and user profile information (e.g., identifying and behavioral information associated with a user). It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein. Embodiments exist where the TSS functionality can be embodied within servers 106, 108, 120 and/or 130.

Moreover, although FIG. 1 illustrates servers 106, 108, 120 and 130 as single computing devices, respectively, the disclosure is not so limited. For example, one or more functions of servers 106, 108, 120 and/or 130 may be distributed across one or more distinct computing devices. Moreover, in one embodiment, servers 106, 108, 120 and/or 130 may be integrated into a single computing device, without departing from the scope of the present disclosure.

Figure 2:
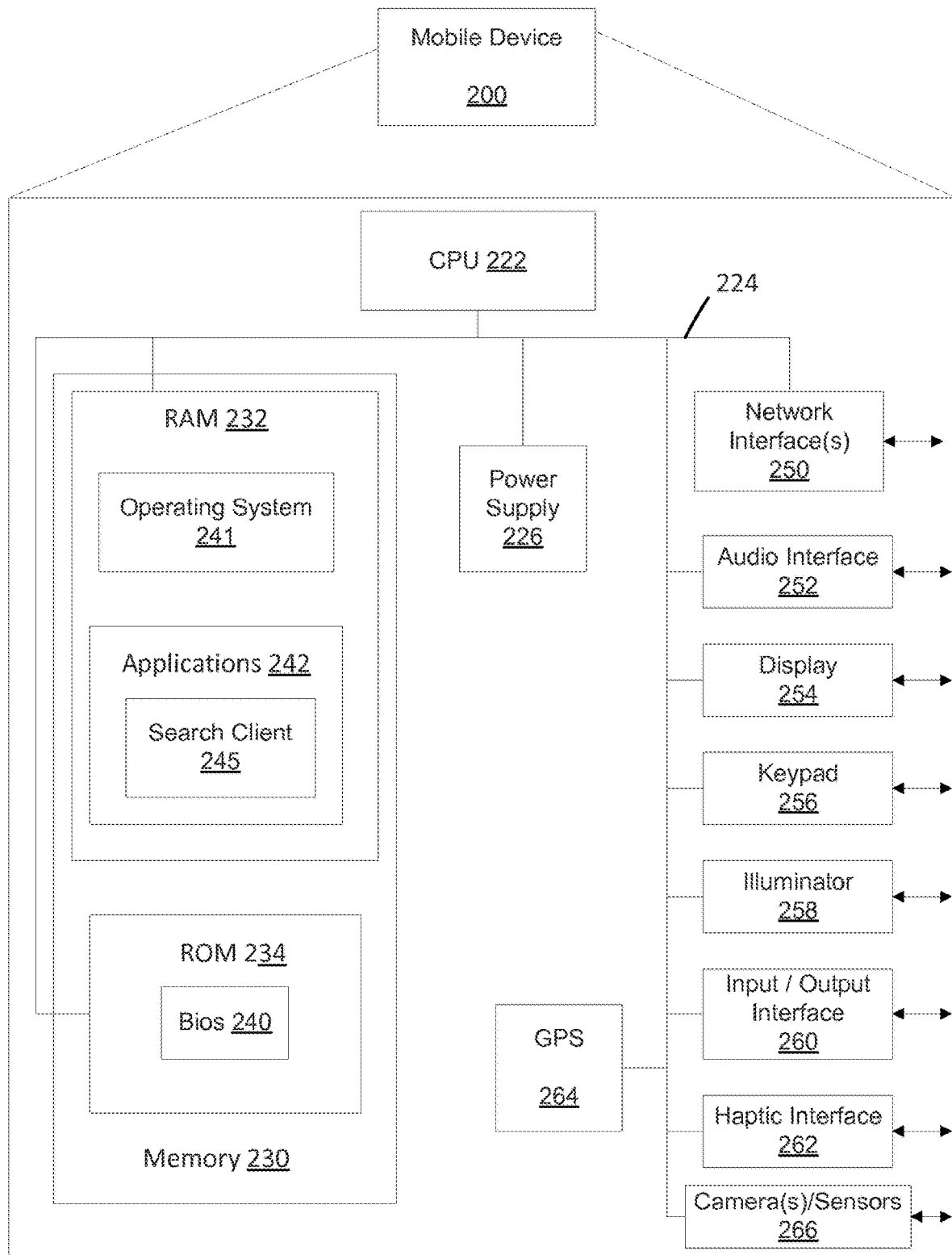
FIG. 2 depicts is a schematic diagram illustrating an example of client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, Client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical, thermal or electromagnetic sensors 266. Device 200 can include one camera/sensor 266, or a plurality of cameras/sensors 266, as understood by those of skill in the art. The positioning of the camera(s)/sensor(s) 266 on device 200 can change per device 200 model, per device 200 capabilities, and the like, or some combination thereof.

Power supply 226 provides power to Client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling Client device 200 to one or more networks, and is constructed for use with one or more communication protocols and technologies as discussed above. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when the Client device 200 receives a communication from another user.

Optional GPS transceiver 264 can determine the physical coordinates of Client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of Client device 200 on the surface of the Earth. It is understood that under different conditions, GPS transceiver 264 can determine a physical location within millimeters for Client device 200; and in other cases, the determined physical location may be less precise, such as within a meter or significantly greater distances. In one embodiment, however, Client device may through other components, provide other information that may be employed to determine a physical location of the device, including for example, a MAC address, Internet Protocol (IP) address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of Client device 200. The mass memory also stores an operating system 241 for controlling the operation of Client device 200. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 230 further includes one or more data stores, which can be utilized by Client device 200 to store, among other things, applications 242 and/or other data. For example, data stores may be employed to store information that describes various capabilities of Client device 200. The information may then be provided to another device based on any of a variety of events, including being sent as part of a header during a communication, sent upon request, or the like. At least a portion of the capability information may also be stored on a disk drive or other storage medium (not shown) within Client device 200.

Applications 242 may include computer executable instructions which, when executed by Client device 200, transmit, receive, and/or otherwise process audio, video, images, and enable telecommunication with a server and/or another user of another client device. Other examples of application programs or "apps" in some embodiments include browsers, calendars, contact managers, task managers, transcoders, photo management, database programs, word processing programs, security applications, spreadsheet programs, games, search programs, and so forth. Applications 242 may further include search client 245 that is configured to send, to receive, and/or to otherwise process a search query and/or search result using any known or to be known communication protocols. Although a single search client 245 is illustrated it should be clear that multiple search clients may be employed. For example, one search client may be configured to enter a search query message, where another search client manages search results, and yet another search client is configured to manage serving advertisements, IMs, emails, and other types of known messages, or the like.

Having described the components of the general architecture employed within the disclosed systems and methods, the components' general operation with respect to the disclosed systems and methods will now be described below.

Figure 3:
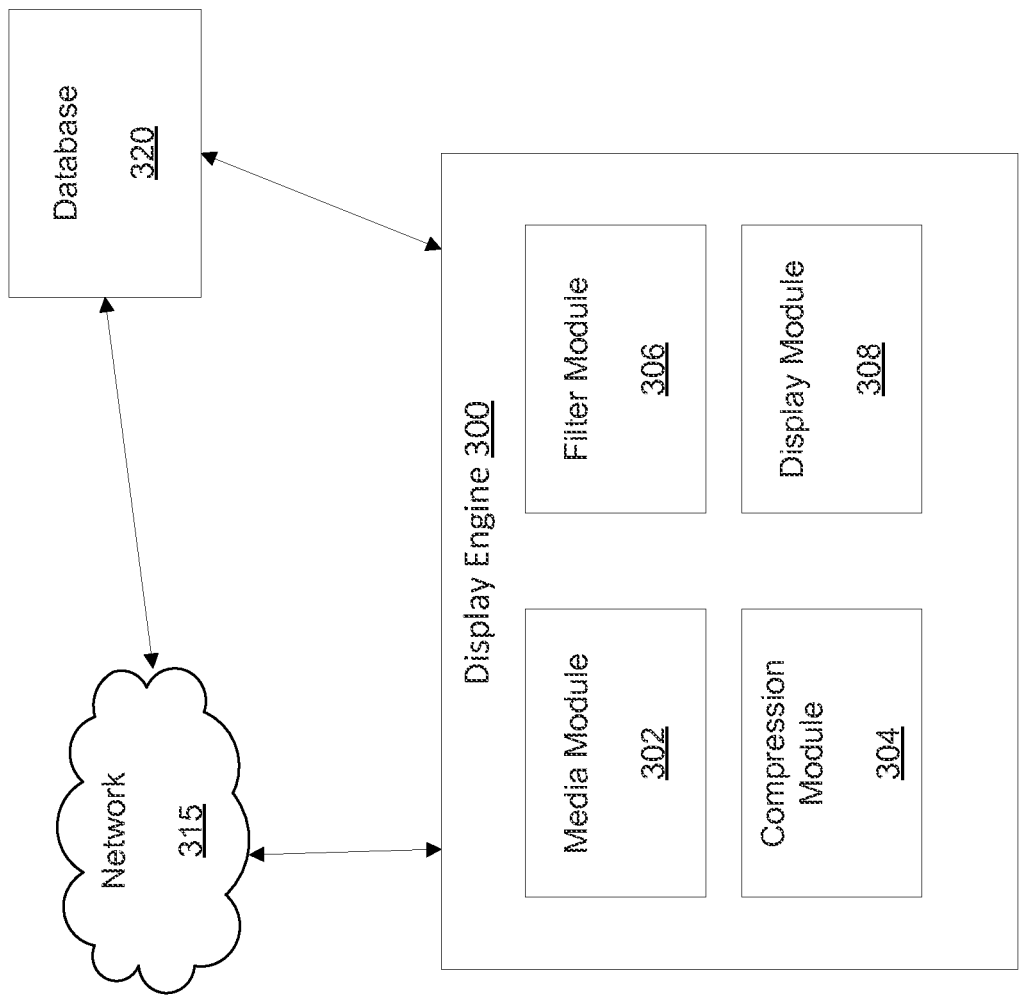
FIG. 3 is a schematic block diagram illustrating components of an exemplary system in accordance with embodiments of the present disclosure.

FIG. 3 is a block diagram illustrating the components for performing the systems and methods discussed herein. FIG. 3 includes a display engine 300, network 315 and database 320. The display engine 300 can be a special purpose machine or processor and could be hosted by an application server, content server, social networking server, web server, search server, content provider, email service provider, ad server, user's computing device, and the like, or any combination thereof.

According to some embodiments, display engine 300 can be embodied as a stand-alone application that executes on a user device. In some embodiments, the display engine 300 can function as an application installed on the user's device, and in some embodiments, such application can be a web-based application accessed by the user device over a network. In some embodiments, the display engine 300 can be installed as an augmenting script, program or application to another media application (e.g., Yahoo!® Video, Netflix®, Hulu®, and the like).

The database 320 can be any type of database or memory, and can be associated with a content server on a network (e.g., content server 106, search server 120 or application server 108 from FIG. 1) or a user's device (e.g., device 101-104 or device 200 from FIGS. 1-2). Database 320 comprises a dataset of data and metadata associated with local and/or network information related to users, services, applications, content (e.g., video) and the like. Such information can be stored and indexed in the database 320 independently and/or as a linked or associated dataset. As discussed above, it should be understood that the data (and metadata) in the database 320 can be any type of information and type, whether known or to be known, without departing from the scope of the present disclosure.

According to some embodiments, database 320 can store data for users, e.g., user data. According to some embodiments, the stored user data can include, but is not limited to, information associated with a user's profile, user interests, user behavioral information, user attributes, user preferences or settings, user demographic information, user location information, user biographic information, and the like, or some combination thereof. In some embodiments, the user data can also include, for purposes rendering and/or delivering videos, user device information, including, but not limited to, device identifying information, device capability information, voice/data carrier information, Internet Protocol (IP) address, applications installed or capable of being installed or executed on such device, and/or any, or some combination thereof. It should be understood that the data (and metadata) in the database 320 can be any type of information related to a user, content, a device, an application, a service provider, a content provider, whether known or to be known, without departing from the scope of the present disclosure.

For purposes of the present disclosure, as discussed above, videos (which are stored and located in database 320) as a whole are discussed within some embodiments; however, it should not be construed to limit the applications of the systems and methods discussed herein. That is, while reference is made throughout the instant disclosure to videos (e.g., video clips, movies, music videos, TV shows, YouTube® videos, Instagram® videos, Vine™ videos, and/or any other type of streaming or downloadable video content), other forms of user generated content and associated information, including for example text, audio, multimedia, RSS feed information can be used without departing from the scope of the instant application, which can thereby be communicated and/or accessed and processed by the display engine 300 according to the systems and methods discussed herein.

As discussed above, with reference to FIG. 1, the network 315 can be any type of network such as, but not limited to, a wireless network, a local area network (LAN), wide area network (WAN), the Internet, or a combination thereof. The network 315 facilitates connectivity of the display engine 300, and the database of stored resources 320. Indeed, as illustrated in FIG. 3, the display engine 300 and database 320 can be directly connected by any known or to be known method of connecting and/or enabling communication between such devices and resources.

The principal processor, server, or combination of devices that comprises hardware programmed in accordance with the special purpose functions herein is referred to for convenience as display engine 300, and includes media module 302, compression module 304, filter module 306 and display module 308. It should be understood that the engine(s) and modules discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed with reference to FIG. 4.

Figure 4:
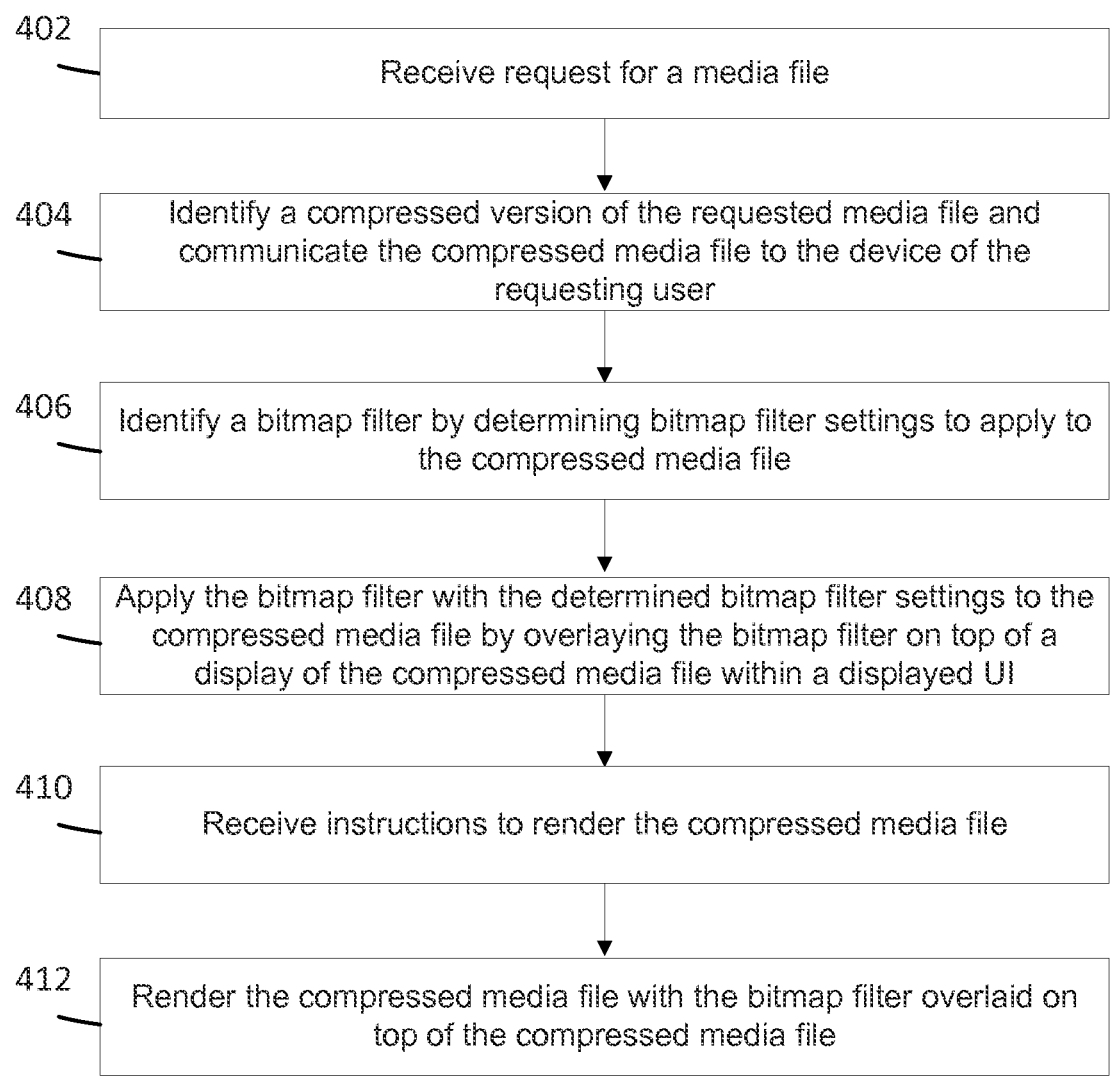
FIG. 4 is a flowchart illustrating steps performed in accordance with some embodiments of the present disclosure.

Turning to FIG. 4, Process 400 details steps performed in accordance with exemplary embodiments of the present disclosure for automatically filtering a compressed video when it is displayed (or rendered) for perceptually modifying the display of the video content in a modified, higher-resolution format without actually modifying the original, compressed media file. It should be understood that while the discussion herein will focus on a compressed media file as the original media file being filtered according to the disclosed filtering systems and methods, such systems and methods can be applied to any type of known or to be known media file, regardless of the file's size, resolution, quality, dimensions, color scheme, or any other type of known or to be known attributes associated with a media file.

Process 400 begins with Step 402 where a user communicates a request for a media file(s) (e.g., media content such as a video file). Step 402 is handled by the media module 302 of the display engine 300. In some embodiments, the request may be in line with a request for a single media item, or may be in accordance with a request for a plurality of media files (or media file information) corresponding to a recommendation listing of media. In either or any type of like embodiments, Step 402 involves the reception of a request to identify at least one media file for the user such that the requested media file is to be played back (i.e., rendered) on the requesting user's device.

In Step 404, the requested media file is identified and communicated to the device of requesting user. Step 404 is performed by the compression module 304. In some embodiments, the identification of the media file can be subject to a search of a media repository, according to any known or to be known systems of identifying indexed media via a search engine or recommendation system. According to some embodiments, the communication of the media file to the requesting user can involve any type of data communication between a data repository, server and a user device, including, but not limited to, downloading, uploading, streaming, peer-to-peer sharing, device pairing, and the like.

According to some embodiments of Process 400, the identified media file is a compressed media file version of the requested media file. In some embodiments, Step 404 can involve identifying an uncompressed, original media file (via the media module 302) and then compressing the identified media file (via the compression module 304). In some embodiments, such compression may occur at the search or server/network side handling the request, and in some embodiments, the compression may occur after delivery to the user on the user's device. As discussed above, while the discussion of Process 400 will focus on compressed media files, any type, size and/or format of media file can be utilized without departing from the scope of the instant disclosure.

As understood by those of skill in the art, media compression uses coding techniques and algorithms to reduce redundancy in media data by combining spatial image compression and temporal motion compensation. Media data may be represented as a series of still image frames. The sequence of frames contains spatial and temporal redundancy that media compression algorithms eliminate or code in a smaller size. Similarities can be encoded by only storing differences between frames. For example, compression algorithms can average a color across similar pixel areas to reduce space, in a manner similar to those used in JPEG image compression. Thus, the identified compressed media file from Step 404 can be subject to any type of compression and/or encoding and decoding scheme, technology or algorithm. That is, the media file may be subject to any known or to be known data compression, bit-reduction, machine learning, digital-signal processing (DSP), inter-frame compression, data differencing, source encoding scheme technology or algorithm, and the like.

For example, some modern compression techniques and algorithms use lossy compression. Uncompressed video requires a very high data rate. Lossless video compression codecs can involve performing an average compression factor of over 3, and a typical MPEG-4 lossy compression video can have a compression factor between 20 and 200. As in all lossy compression, there is a trade-off between video quality, cost of processing the compression and decompression, and system requirements. Thus, for example, upon rendering such high-compressed media, visible or distracting artifacts may be displayed due to the applicable compression factor and data reduction. As discussed herein, Process 400 remedies such visual distractions by perceptually removing them via the applied bitmap filter.

In another example, some modern media compression schemes operate on square-shaped groups of neighboring pixels, referred to as macro-blocks. These pixel groups or blocks of pixels are compared from one frame to the next, and the applied media compression codec identifies only the differences within those blocks. In areas of video with more motion, the compression must encode more data to keep up with the larger number of pixels that are changing. Therefore, when such compressed media files are rendered, the quality is decreased due to a reduced variable rate between the pixel blocks of the media file—such as, for example, when the media displays explosions, flames, flocks of animals, sports, panning shots and the like. Again, as discussed herein, Process 400 remedies such low-quality display by perceptually improving the quality via the applied bitmap filter.

In Step 406, a bitmap filter is identified by determining bitmap filter settings (or attributes or parameters) which are to be applied to the identified and received compressed media file as the bitmap filter. Step 406 is performed by the filter module 306.

In some embodiments, the bitmap filter settings are determined by automatically analyzing the compressed media file (from Step 404) in order to determine the parameters associated with rendering such file. These parameters can include, but are not limited to, the compression scheme applied to the original file, the attributes of the compressed file (including, but not limited to, size, compression factor, resolution and the like), the color, brightness, hue, opacity and the like, frame rate of the compressed file, number of frames in the compressed file, number of pixels per frame, the capabilities of the application and/or device rendering the compressed media file, and the like, or some combination thereof. Identification of such parameters can include analyzing the data and/or metadata of the compressed media file and determining, extracting or otherwise identifying values that provide an indication as to such parameters.

In some embodiments, once the parameters of the media file are identified, corresponding bitmap filter parameters (or attributes) can be automatically determined (or selected) so that the rendering of the media file results in the displayed content appearing a particular way—or, in other words, having display attributes corresponding to a desired color, sharpness, resolution, brightness, quality, hue, opacity and the like, as discussed in more detail below. In some embodiments, the bitmap filter parameters can be automatically selected so that the displayed content of the compressed media file satisfies a threshold (or level) that can be associated with, but not limited to, quality, resolution, color value(s), and/or any other type of content attribute that is associated with the clarity and/or quality of content's display.

In some embodiments, the determination of the bitmap filter settings can be resultant of a selection by a user. In such embodiments, the user can select individual filter parameters for the bitmap filter. For example, the user can select a filter parameter that will perceptually modify the clarity of a video's display, another filter parameter that will perceptually modify the color of the video content, and yet another filter parameter that will affect the opacity of the video's display (so that the video can be displayed in the background behind overlaid and displayed text or other content). In some embodiments, a user can select a preset bitmap filter, which comprises at least one filter parameter, or a combination of filter parameters that effectuates a desired display (e.g., perceptual modification of the displayed content), as discussed herein.

The bitmap filter settings determined from Step 406 are utilized to generate or form the bitmap filter that is applied to the compressed media file. Step 408, which Step is performed by the filter module 306. As discussed herein, the bitmap filter is applied to the compressed media file by overlaying the bitmap filter on top of a display of the compressed media file within a displayed user interface (UI). As discussed above, the UI can be associated with a user's device, and/or can be associated with an application that is providing access to media information associated with the compressed media file(s).

Figure 5:
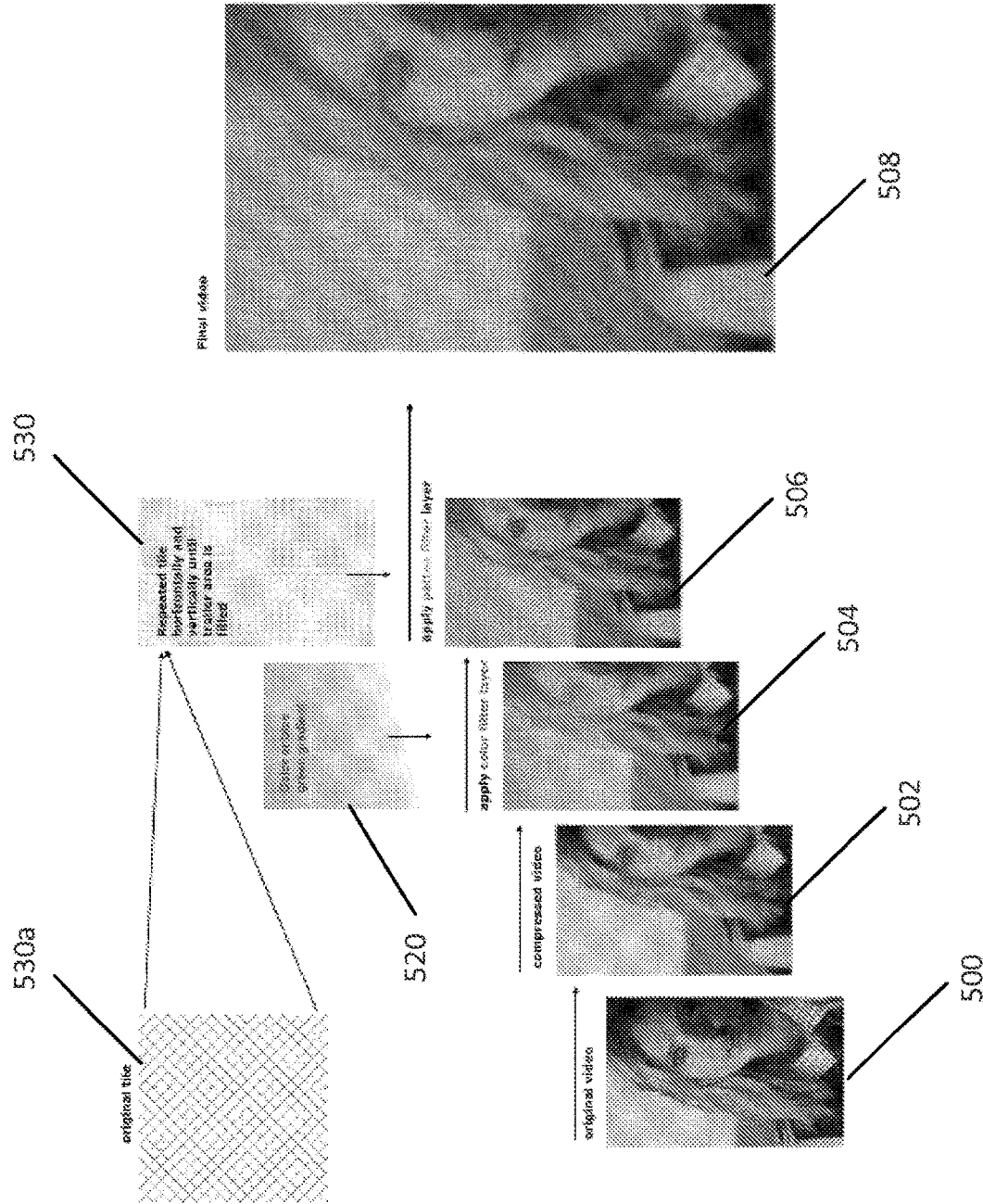
FIG. 5 illustrates a non-limiting example of disclosed filter techniques in accordance with some embodiments of the present disclosure.

According to some embodiments, the bitmap filter comprises two layers (or sub-filters): a gradient layer and a tile (or mesh) layer. Each layer has associated therewith bitmap filter settings associated with the settings determined in Step 406. Discussion of Step 408 (and subsequently Step 412) will be made in reference to FIG. 5, which illustrates a non-limiting example embodiment of the application of an applied bitmap filter. FIG. 5 illustrates, as discussed below, an original media file 500 and a compressed media file 502 (as discussed above in relation to Steps 402-404), the visual effects 504 of the application of gradient (or color) filter layer 520 of the bitmap filter, the visual effects 506 of the application of the tile (or pattern or "mesh") filter layer 530 of the bitmap filter, and the overall result 508 of the application of the bitmap filter on a compressed media file's display and/or rendering.

As understood by those of skill in the art, each layer 520 and 530 of the bitmap filter (and the bitmap filter as a whole) has a level of transparency associated therewith so that despite its application respective to the compressed media file 502, the content being rendering behind the bitmap filter is still clearly viewable on a display of a device. Thus, the bitmap filter is transparent to the viewing user and is not noticeable or detectable by the viewing user. The transparency level can be set according to parameters set by a user, the creator (or artist) of the filter, the system or display engine 300, in accordance with resolution and/or dimensional display qualities of a rendering device, an administrator, or some combination thereof. According to some embodiments, the order of application of the gradient layer 520 and the tile layer 5006 are interchangeable. In some embodiments, the gradient layer 520 can be situated directly above the compressed media file 502 with the tile layer 530 on top of the gradient layer 520; and in some embodiments, the tile layer 530 can be situated directly above the compressed media file 502 with the gradient layer 520 on top of the tile layer 530.

According to some embodiments, the bitmap filter, as a whole, can perform a convolution operation(s) on a displayed frame of a media file (e.g., video file frame of the compressed media file 502) in order to achieve blurring, sharpening, edge extraction, noise removal and the like. As understood by those of skill in the art, a convolution action involves multiplying the pixels in a predetermined area of each pixel in the frame by a set of static or dynamic weights, then replacing each pixel in the area by the sum of the product. The value of such weights depends on the desired output; or in other words, the value is set by the filter/layer being applied. For example, if a 50% opacity layer is being applied to an image frame, then the weight applied in the convolution action is set in accordance with a 50% opacity value.

According to some embodiments, in order to prevent the overall brightness of the image from changing, the weights can be designed to sum to a unity (or threshold) value, or the convolution can be followed by a normalization operation, which divides the result by the sum of the weights in order to ensures that the pixel values in the displayed frame are of the same relative magnitude as those in the input frame. For example, a weighted average in the predetermined area of each pixel is determined and the determined average perceptually replaces each original pixel's value upon their display.

Thus, the bitmap filter, and thereby the gradient layer 520 and tile layer 530, can be applied through a process involving providing a set of weights to apply to the corresponding pixels in a predetermined size area or an media frame. According to some embodiments of the instant disclosure, the set of weights are compiled into what is understood by those of skill in the art as a convolution kernel, which can be represented in a table or matrix-like form, where the position in the table or matrix corresponds to the appropriate pixel in the predetermined area of the media frame. In some embodiments, the bitmap filter, realized by those of skill in the art as a novel type of convolution kernel (or filter comprising the disclosed gradient and tile layers, as discussed below) can have a set of dimensions corresponding to a square shape or other forms associated with an media frame, a device's display dimensions and/or a displayed user interface's dimensions.

According to embodiments, the bitmap filter is applicable for any type of media file, including, but not limited to, video, images, text, and/or any other type of multimedia content, and even audio when a similar sort of filter layers are applied that audibly alter the audio information of an audio file. While the discussion herein will focus on video content items and the sequence of frames that constitute the video content of such file, it should not be construed as limiting, as any type of content or multimedia content, whether known or to be known, can be utilized without departing from the scope of the instant disclosure.

According to some embodiments, the gradient layer 520 of the bitmap filter is applied over displayed or rendered media content (of the compressed media file 502). The gradient layer 520 effectuates visual changes 504 to the display of each frame and/or pixel in the video. That is, as each frame and thereby pixel in each frame of a media file is rendered (or displayed), the gradient layer 520 perceptually changes the appearance of each frame/pixel, thereby only modifying the media file's display values according to settings of the applied layer. By way of non-limiting examples, the gradient layer 520 can result in the alteration of the appearance of a video's displayed opacity values, tone values, color values (e.g., RGB, L*a*b, CMYK, and the like), hue, brightness, intensity and the like.

For example, when a user is being presented with video content, through the application of a simple blue/green (gradient) filter 520 as illustrated in FIG. 5, the RGB values of the videos pixels (or frames) appear to be altered or skewed towards blue/green values associated with the filter 520 (illustrated as item 504), because the viewing user is seeing the video through the blue/green filter 520. The gradient layer 520, therefore, can provide a directional change in the intensity or color values of pixels that are viewed through the gradient layer 520. According to some embodiments, the effects 504 of the gradient layer 520 are viewable down to the pixel value; and in some embodiments, the effects 504 of the gradient layer 520 are viewable per frame of a media file.

According to some embodiments, the size of the gradient layer 520 can be scaled according to a number of parameters, such as, but not limited to, the dimensional values of the displayed media content, the display resolution of the media content, the display resolution of the device displaying the media, size or dimensions of the rendering window, side of the portion of a user interface (UI) displaying the media, and the like, or some combination thereof. In some embodiments, the gradient layer 520 can involve the application of any known or to be known color progression technology, including but not limited to, graduated neutral-density (ND) filters, Sobel operators, Bayer filter, feature detection, Prewitt operators, Laplace operators, and the like, as well as any other type of known or to be known artist generated filter, such as those associated with or resident on image capture websites and applications (e.g., Instagram®, Flickr® and the like), or some combination thereof.

According to some embodiments, the tile layer 530 (also referred to as the mesh layer or "mesh") of the bitmap filter is also applied over displayed or rendered content of the compressed media file 502. Application of the tile layer 530 over rendered media content of the compressed media file is directed to exploiting the "true details" of the media content that are not visible in a compressed or low-quality media 502. This enables low-resolution content to be perceptually sharpened or brightened, for example, to perceptually a high-resolution format when viewed by a user through the tile layer 530. In some embodiments, the tile layer can perform any type of known or to be known anti-aliasing techniques or mechanism in order to sharpen the focus of the displayed content (e.g., pixels) while smoothing the transitions between media frames. Such techniques include, but are not limited to, nearest-neighbor interpolation, mipmapping, bilinear filtering, anisotropic filtering, and the like, or any other types of known or to be known edge, corner, blob or ridge detection techniques or algorithms.

According to some embodiments, the tile layer 530 comprises a pixel square (or value) 530a of a predetermined size (or value) being applied according to a predetermined recursive pattern within a set dimensional value. In a non-limiting example, the tile layer 530 can comprise an 8×8 pixel being repeated in a horizontal then vertical pattern, or vice versa. The repetition of the 8×8 pixel value is repeated until a "mesh" is created, as illustrated in FIG. 5 as item 530, which is in accordance with a properties associated with the displayed media or device (or UI) displaying the media. Such properties can include a value associated with, but not limited to, the dimensional values of the media content, the display resolution of the media content, the display resolution of the device displaying the media, the display window, UI portion or interface element displaying the media content, and the like, or some combination thereof. Therefore, a tile layer 530 is created by building a "mesh" from a predetermined number of pixel squares 530a adjacently organized to correlate with display properties of a displayed media (whether those settings, as above, are associated with the media and/or device or application displaying the media).

Illustration of an example "mesh" can be seen in FIG. 5, where the pixel square (or value) is item 530a, and the mesh 530 is created from a duplication (or multiplication) of pixel square 530a until the display of the compressed media file is covered—resulting in the mesh or tile layer 530. As understood by those of skill in the art, application of a "mesh" by the tile layer 530 can effectuate a visual enhancement of the displayed media content. In some embodiments, the enhancement may only be realized in accordance with the media content that is overlaid by the "edges" of the mesh—the lines that connect the square pixels 530a (within 530) recursively repeated for creating the mesh. In some embodiments, such enhancements can be realized by the edges, the pixel space between the edges (or within the pixel squares), or some combination thereof. As understood by those of skill in the art, application of the mesh by the tile layer 530 can result in enhancement to media's focal blur (which may be caused by a finite depth-of-field and/or finite point spread function), penumbral blur (which can be caused by shadows created by light sources of non-zero radius), shading, and the like, or some combination thereof, which are examples of typical visual effects that can affect the display/rendering of a compressed and/or low-quality media file.

Therefore, the application of the tile layer 530 effectuates perceptual changes in, for example, sharpness, brightness and/or contrast of displayed video frames (for example, as illustrated in FIG. 5, item 506 which shows the displayed image being clarified and sharpened from the image displays in items 502 and 504). The perceptual changes can remedy any discontinuities in depth, discontinuities in surface ori-entation, changes in material properties and variations in scene illumination that may be associated with display of compressed media. According to some embodiments, the tile layer 530 can lead a viewing user to perceptually see viewpoint changes in the media content via increased clarity similar to a high-resolution media format, as the boundaries of objects depicted in each media frame, as well as the structural properties within each frame appear to have higher values of brightness, contrast, sharpness, hue, and the like.

Continuing with Process 400, Steps 410 and 412 are performed by the display module 308. In Step 410, after the compressed media file is received (Step 404) and the bitmap filter is applied (Steps 406-408), instructions are received to render the compressed media file. In some embodiments, Step 410 can be automatically performed upon receiving the media file, and in some embodiments, Step 410 can be in response to any type of known or to be known user input.

As a result, Step 412 is performed which involves rendering the compressed media file 504 with the bitmap filter (i.e., gradient layer 520 and tile layer 530) overlaying the display of the compressed media file. As discussed above, the application of the bitmap filter involves rendering the compressed media in the background (or behind) the bitmap filter which is placed on top (or in the foreground) so that the media content is being played behind the applied bitmap filter. In some embodiments, the UI that displays the compressed media file can comprise multiple layers. For example, the media file may be displayed in the lower layer, and the gradient and tile layers can be displayed interchangeably in the layer (or layers) atop that lower layer. Therefore, as the media is rendered, each frame and pixel of the video is filtered (e.g., viewed or displayed) according to the gradient layer 520 and tile layer 530 of the applied bitmap filter, as discussed above. The result is a filtered media file 508 being rendered with the visual effects of the those filter parameters associated with the gradient layer 520 (as illustrated in item 504) and the tile layer 530 (as illustrated in item 506) being displayed on the UI as the file is being rendered.

According to some embodiments, the disclosed systems and methods can be implemented within video recommendation systems. That is, for example, through implementation of the disclosed systems and methods, users can be provided with the novel functionality of viewing video content in place of the cover art when a media recommendation is presented to a user. Conventional recommendation systems typically only enable a user to view information about a recommended media item, such as, for example, cover art for a movie. The disclosed systems and methods provide improved, novel functionality and capabilities to such systems by providing mechanisms for recommended media items to be rendered in the background of a recommendation listing, thereby providing a preview of a recommended media item.

For example, if user Bob is being presented with a recommendation listing of movies X, Y and Z, conventional systems only enable Bob the ability to view information about the movies, and if Bob desired to view the trailer of movies X, Y and Z, he would have to select a respective movie from the listing and be taken to another page or display window to view the trailer content.

Through implementations of the disclosed systems and methods, Bob can view the video content of a recommended movie in the background. For example, since movie X is ranked highest in the recommendation listing, when the listing of X, Y and Z is presented to Bob (as a result of Steps 402-404), the video content (i.e., trailer) of movie X is rendered in the background of the listing. In some embodiments, the rendering of movie X's trailer can be displayed within a designated interface element or portion of the UI displaying the recommendation listing. The rendering of the trailer for movie X can be subject to the filtering techniques discussed in relation to Steps 406-412, whereby the rendered trailer, which can be a compressed video file, may be filtered by the disclosed bitmap filter according to parameters (of the gradient layer 520 and tile layer 530) in order to appear (be displayed) with a level of opaqueness while maintaining a level of clarity and sharpness despite the recommendation listing being clearly displayed over top the video's playback. This provides Bob with the ability to preview the movie and make decisions as to whether the recommended movie(s) comprises content he actually desires to watch. In some embodiments, Bob can change the video being rendered in the background by selecting movies Y or Z, whereby the filtering process of Process 400 (at least Steps 406-412) are performed again to the filter the content of movie Y or Z accordingly.

According to some embodiments of the present disclosure, information associated with the filtered media, as discussed above in relation to Process 400, can be fed back to the display engine 300 for modeling (or training) of the information stored in database 320 via iterative or recursive bootstrapping or aggregation functionality. This can improve the accuracy and/or efficiency of future filtering of compressed media. Embodiments of the present disclosure involve the display engine 300 applying such recursive/bootstrapping functions utilizing any known or to be known open source and/or commercial software machine learning algorithm, technique or technology.

Figure 6:
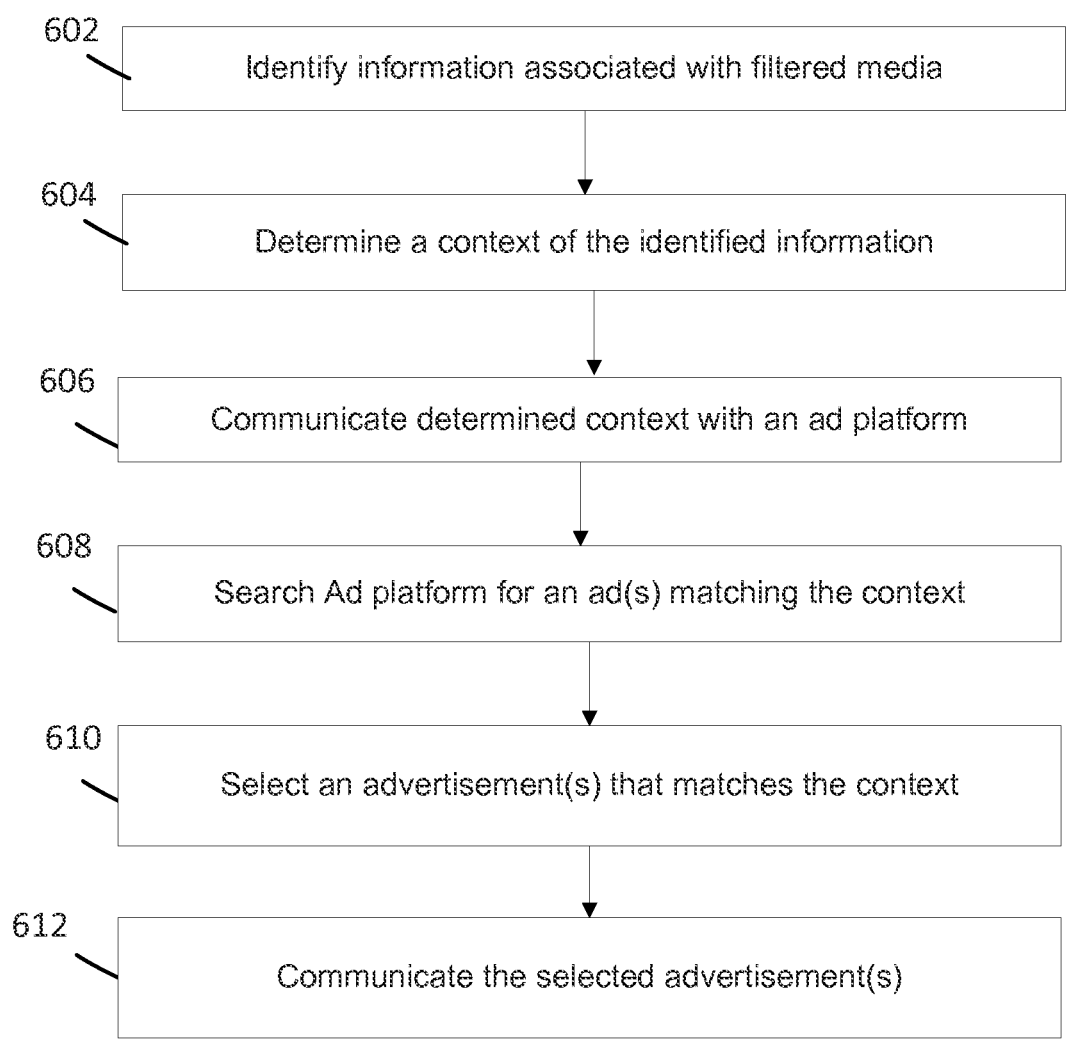
FIG. 6 is a flowchart illustrating steps performed in accordance with some embodiments of the present disclosure.

FIG. 6 is a work flow example 600 for serving relevant digital content associated with advertisements (e.g., advertisement content) based on the information associated with the filtered media, as discussed above in relation to FIGS. 4-5. Such information, referred to as "recommendation information" for reference purposes only, can include, but is not limited to, the identity of the application the user uses to render or request the filtered media (or compressed media), the type of media content being rendered, the content of such media, and the like, and/or some combination thereof.

As discussed herein, reference to an "advertisement" should be understood to include, but not be limited to, digital content that provides information provided by another user, service, third party, entity, and the like. Such digital ad content can include any type of media renderable by a computing device, including, but not limited to, video, text, audio, images, and/or any other type of known or to be known multi-media. In some embodiments, the digital ad content can be formatted as hyperlinked multi-media content that provides deep-linking features and/or capabilities.

By way of a non-limiting example, work flow 600 includes a user requesting a video and being presented with a filtered compressed media item related to the television show "House of Cards". Based on information related to the filtered media item, for example, the user may be provided with digital ad content related to coupons for purchasing the shows recent season on DVD (e.g., based on the determined content of the filtered video).

In Step 602, recommendation information associated with the filtered media is identified. As discussed above, the recommendation information can be based on the filtering and display process outlined above with respect to FIGS. 3-5. For purposes of this disclosure, Process 600 will refer to single filtered media file as the basis for serving an advertisement(s); however, it should not be construed as limiting, as any number of media files can form such basis, without departing from the scope of the instant disclosure.

In Step 604, a context is determined based on the identified recommendation information. This context forms a basis for serving advertisements related to the recommendation information. In some embodiments, the context can be determined by determining a category which the recommendation information of Step 602 represents. For example, the category can be related to the type of the filtered media, and/or can be related to the content type of the filtered media. In some embodiments, the identification of the context from Step 604 can occur before, during and/or after the analysis detailed above with respect to Process 400, or some combination thereof.

In Step 606, the context (e.g., content/context data) is communicated (or shared) with an advertisement platform comprising an advertisement server 130 and ad database. Upon receipt of the context, the advertisement server 130 performs a search for a relevant advertisement within the associated ad database. The search for an advertisement is based at least on the identified context.

In Step 608, the advertisement server 130 searches the ad database for an advertisement(s) that matches the identified context. In Step 610, an advertisement is selected (or retrieved) based on the results of Step 608. In some embodiments, the selected advertisement can be modified to conform to attributes of the page, message or method upon which the advertisement will be displayed, and/or to the application and/or device for which it will be displayed. In some embodiments, the selected advertisement is shared or communicated via the application the user is utilizing to render the media. Step 612. In some embodiments, the selected advertisement is sent directly to each user's computing device. In some embodiments, the selected advertisement is displayed in conjunction with the rendering of the filtered media on the user's device and/or within the application being used to render the filtered media.

Figure 7:
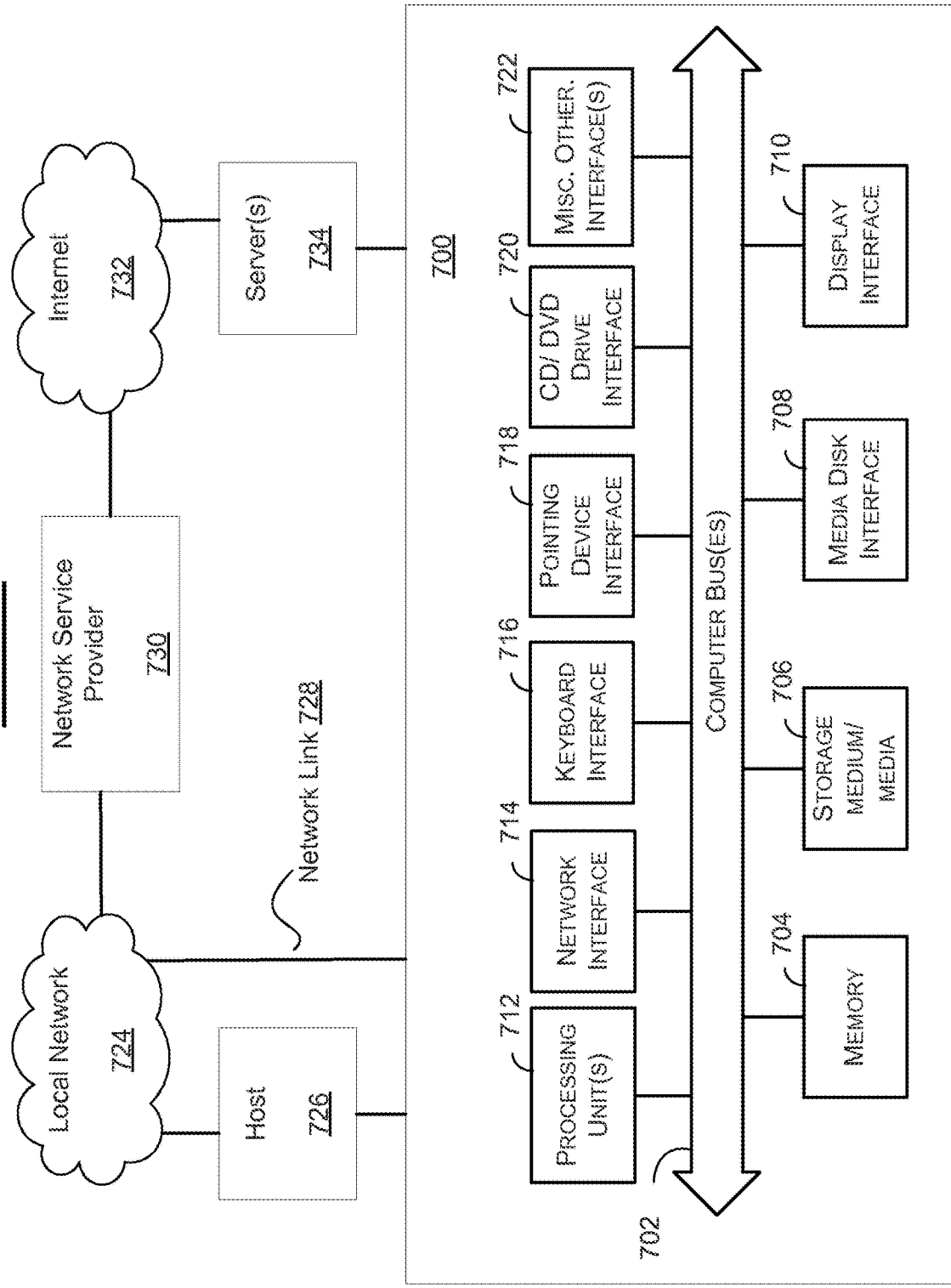
FIG. 7 is a block diagram illustrating architecture of an exemplary hardware device in accordance with one or more embodiments of the present disclosure.

As shown in FIG. 7, internal architecture 700 of a computing device(s), computing system, computing platform and the like includes one or more processing units, processors, or processing cores, (also referred to herein as CPUs) 712, which interface with at least one computer bus 702. Also interfacing with computer bus 702 are computer-readable medium, or media, 706, network interface 714, memory 704, e.g., random access memory (RAM), run-time transient memory, read only memory (ROM), media disk drive interface 720 as an interface for a drive that can read and/or write to media including removable media such as floppy, CD-ROM, DVD, media, display interface 710 as interface for a monitor or other display device, keyboard interface 716 as interface for a keyboard, pointing device interface 718 as an interface for a mouse or other pointing device, and miscellaneous other interfaces not shown individually, such as parallel and serial port interfaces and a universal serial bus (USB) interface.

Memory 704 interfaces with computer bus 702 so as to provide information stored in memory 704 to CPU 712 during execution of software programs such as an operating system, application programs, device drivers, and software modules that comprise program code, and/or computer executable process steps, incorporating functionality described herein, e.g., one or more of process flows described herein. CPU 712 first loads computer executable process steps from storage, e.g., memory 704, computer readable storage medium/media 706, removable media drive, and/or other storage device. CPU 712 can then execute the stored process steps in order to execute the loaded computer-executable process steps. Stored data, e.g., data stored by a storage device, can be accessed by CPU 712 during the execution of computer-executable process steps.

Persistent storage, e.g., medium/media 706, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 728 typically provides information communication using transmission media through one or more networks to other devices that use or process the information. For example, network link 728 may provide a connection through local network 724 to a host computer 726 or to equipment operated by a Network or Internet Service Provider (ISP) 730. ISP equipment in turn provides data communication services through the public, worldwide packet-switching communication network of networks now commonly referred to as the Internet 732.

A computer called a server host 734 connected to the Internet 732 hosts a process that provides a service in response to information received over the Internet 732. For example, server host 734 hosts a process that provides information representing video data for presentation at display 710. It is contemplated that the components of system 700 can be deployed in various configurations within other computer systems, e.g., host and server.

At least some embodiments of the present disclosure are related to the use of computer system 700 for implementing some or all of the techniques described herein. According to one embodiment, those techniques are performed by computer system 700 in response to processing unit 712 executing one or more sequences of one or more processor instructions contained in memory 704. Such instructions, also called computer instructions, software and program code, may be read into memory 704 from another computer-readable medium 706 such as storage device or network link. Execution of the sequences of instructions contained in memory 704 causes processing unit 712 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 700. Computer system 700 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 702 as it is received, or may be stored in memory 704 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
   communicating, via a computing device, a request for a digital media file;
   receiving, via the computing device, a compressed version of the requested digital media file comprising low-quality display attributes;

analyzing, via the computing device, said compressed version of the requested digital media file, and based on said analysis, automatically identifying information indicating a compression scheme of said compressed version for encoding and decoding said digital media file;

automatically identifying, via the computing device, based on said compression scheme information, a bitmap filter, said identified bitmap filter comprising filter settings associated with high-quality display attributes that correspond to the compression scheme; and transparently displaying, via the computing device, said bitmap filter as an overlay of the compressed version of the requested digital media file within a user interface (UI) displayed by the computing device, said overlaid transparent display of the bitmap filter causing the low-quality display attributes of the compressed version to be displayed as said high-quality display attributes.

2. The method of claim 1, wherein said caused display of the low-quality display attributes of the compressed version as said high-quality display attributes occurring without uncompressing said compressed version of the requested digital media file.

3. The method of claim 1, wherein said compression scheme information comprises data selected from a group consisting of: a frame rate of the compressed file, number of frames in the compressed file, and number of pixels per compressed frame.

4. The method of claim 3, wherein said filter settings are based on said compression scheme information, wherein said bitmap filter comprises an individual layer for each data item comprised within said compression scheme.

5. The method of claim 1, wherein said display attributes of the compressed version of the requested digital media file comprise gradient parameters and resolution parameters.

6. The method of claim 5, wherein said gradient parameters comprise information selected from a group consisting of: color, opacity, tone, hue, brightness and intensity.

7. The method of claim 5, wherein said resolution parameters comprise information selected from a group consisting of: resolution, sharpness, contrast, illumination, blur and depth.

8. The method of claim 1, wherein values of the filter settings of the bitmap filter satisfy a clarity and quality threshold that causes said low-quality display attributes to be displayed at said high-quality display attributes.

9. The method of claim 8, wherein said high-quality display attributes comprise gradient and resolution parameters at or above said clarity and quality threshold.

10. A non-transitory computer-readable storage medium tangibly encoded with computer-executable instructions, that when executed by a computing device, perform a method comprising:

communicating, via the computing device, a request for a digital media file;

receiving, via the computing device, a compressed version of the requested digital media file comprising low-quality display attributes;

analyzing, via the computing device, said compressed version of the requested digital media file, and based on said analysis, automatically identifying information indicating a compression scheme of said compressed version for encoding and decoding said digital media file;

automatically identifying, via the computing device, based on said compression scheme information, a bitmap filter, said identified bitmap filter comprising filter settings associated with high-quality display attributes that correspond to the compression scheme; and transparently displaying, via the computing device, said bitmap filter as an overlay of the compressed version of the requested digital media file within a user interface (UI) displayed by the computing device, said overlaid transparent display of the bitmap filter causing the low-quality display attributes of the compressed version to be displayed as said high-quality display attributes.

11. The non-transitory computer-readable storage medium of claim 10, wherein said caused display of the low-quality display attributes of the compressed version as said high-quality display attributes occurring without uncompressing said compressed version of the requested digital media file.

12. The non-transitory computer-readable storage medium of claim 10, wherein said compression scheme information comprises data selected from a group consisting of: a frame rate of the compressed file, number of frames in the compressed file, and number of pixels per compressed frame.

13. The non-transitory computer-readable storage medium of claim 12, wherein said filter settings are based on said compression scheme information, wherein said bitmap filter comprises an individual layer for each data item comprised within said compression scheme.

14. The non-transitory computer-readable storage medium of claim 10, wherein said display attributes of the compressed version of the requested digital media file comprise gradient parameters and resolution parameters.

15. The non-transitory computer-readable storage medium of claim 14, wherein said gradient parameters comprise information selected from a group consisting of: color, opacity, tone, hue, brightness and intensity.

16. The non-transitory computer-readable storage medium of claim 14, wherein said resolution parameters comprise information selected from a group consisting of: resolution, sharpness, contrast, illumination, blur and depth.

17. The non-transitory computer-readable storage medium of claim 10, wherein values of the filter settings of the bitmap filter satisfy a clarity and quality threshold that causes said low-quality display attributes to be displayed at said high-quality display attributes.

18. The non-transitory computer-readable storage medium of claim 17, wherein said high-quality display attributes comprise gradient and resolution parameters at or above said clarity and quality threshold.

19. A computing device comprising:

a processor; and a non-transitory computer-readable storage medium for tangibly storing thereon program logic for execution by the processor, the program logic comprising:

logic executed by the processor for communicating, via the computing device, a request for a digital media file;

logic executed by the processor for receiving, via the computing device, a compressed version of the requested digital media file comprising low-quality display attributes;

logic executed by the processor for analyzing, via the computing device, said compressed version of the requested digital media file, and based on said analysis, automatically identifying information indicating a compression scheme of said compressed version for encoding and decoding said digital media file;

logic executed by the processor for automatically identifying, via the computing device, based on said compression scheme information, a bitmap filter, said identified bitmap filter comprising filter settings associated with high-quality display attributes that correspond to the compression scheme; and logic executed by the processor for transparently displaying, via the computing device, said bitmap filter as an overlay of the compressed version of the requested digital media file within a user interface (UI) displayed by the computing device, said overlaid transparent display of the bitmap filter causing the low-quality display attributes of the compressed version to be displayed as said high-quality display attributes.

20. The computing device of claim 19, wherein said caused display of the low-quality display attributes of the compressed version as said high-quality display attributes occurring without uncompressing said compressed version of the requested digital media file.

* * * * *